United States Patent
Ham et al.

(10) Patent No.: US 9,501,164 B2
(45) Date of Patent: Nov. 22, 2016

(54) THIN FILM TRANSISTOR LIQUID CRYSTAL DISPLAY HAVING CAPACITIVE TOUCH SENSOR EMBEDDED THEREIN

(71) Applicant: SILICON DISPLAY TECHNOLOGY, Yongin-si, Gyeonggi-do (KR)

(72) Inventors: Yong Ju Ham, Bucheon-si (KR); Ji Ho Hur, Yongin-si (KR); Ki Joong Kim, Suwon-si (KR)

(73) Assignee: SILICON DISPLAY TECHNOLOGY, Yongin-Si, Gyeonggi-Do (KR)

( * ) Notice: Subject to any disclaimer, the term of this patent is extended or adjusted under 35 U.S.C. 154(b) by 0 days.

(21) Appl. No.: 14/426,726

(22) PCT Filed: Jul. 12, 2013

(86) PCT No.: PCT/KR2013/006246
§ 371 (c)(1),
(2) Date: Mar. 6, 2015

(87) PCT Pub. No.: WO2014/038782
PCT Pub. Date: Mar. 13, 2014

(65) Prior Publication Data
US 2015/0242033 A1    Aug. 27, 2015

(30) Foreign Application Priority Data
Sep. 7, 2012   (KR) .................. 10-2012-0099328

(51) Int. Cl.
| G06F 3/045 | (2006.01) |
| G06F 3/041 | (2006.01) |
| G02F 1/1333 | (2006.01) |
| G06F 3/044 | (2006.01) |
| G09G 3/36 | (2006.01) |

(52) U.S. Cl.
CPC ......... *G06F 3/0412* (2013.01); *G02F 1/13338* (2013.01); *G06F 3/044* (2013.01); *G09G 3/3648* (2013.01)

(58) Field of Classification Search
None
See application file for complete search history.

(56) References Cited

U.S. PATENT DOCUMENTS

| 2009/0066866 A1* | 3/2009 | Takama | G02F 1/13338 349/33 |
| 2011/0242044 A1 | 10/2011 | Liu | |
| 2011/0316809 A1* | 12/2011 | Kim | G06F 3/0412 345/174 |

FOREIGN PATENT DOCUMENTS

KR    10-2011-0027397 A    3/2011

OTHER PUBLICATIONS

International Search Report dated Aug. 27, 2013 issued in Application No. PCT/KR2013/006246 (with English translation).

*Primary Examiner* — Joseph Haley
*Assistant Examiner* — Ifedayo Iluyomade
(74) *Attorney, Agent, or Firm* — Revolution IP, PLLC

(57) ABSTRACT

Provided is a thin film transistor liquid crystal display (TFT LCD) in which a capacitive touch sensor is embedded, the TFT LCD comprising: a touch sensor source follower TFT formed on a substrate; a first electrode connected to a gate electrode of the touch sensor source follower TFT; a touch sensor reset TFT including the first electrode; an insulator film formed on the first electrode; a second electrode formed on the insulator film; and a display switching TFT including the second electrode, wherein the second electrode is connected to a drain electrode of the display switching TFT; the touch sensor reset TFT and the gate electrode of the touch sensor source follower TFT share the first electrode; and the first electrode is connected to the gate electrode of the touch sensor source follower TFT.

16 Claims, 7 Drawing Sheets

THIN FILM TRANSISTOR LIQUID CRYSTAL DISPLAY HAVING CAPACITIVE TOUCH SENSOR EMBEDDED THEREIN

CROSS-REFERENCE TO RELATED PATENT APPLICTIONS

This application is a U.S National Stage Application under 35 U.S.C. §371 of PCT Application No. PCT/KR2013/006246, filed Jul. 12, 2013, which claims priority to Korean Patent Application No. 10-2012-0099328, filed Sep. 7, 2012, whose entire disclosures are hereby incorporated by reference.

TECHNICAL FIELD

The present invention relates to a thin film transistor liquid crystal display (TFT LCD), more specifically, to a thin film transistor liquid crystal display (TFT LCD) in which a capacitive touch sensor is embedded.

BACKGROUND ART

A liquid crystal display (LCD) displays an image by adjusting light transmittance of a liquid crystal screen using an electric field. Such a liquid crystal display is divided into a horizontal electric field applying type liquid crystal display and a vertical electric field applying type liquid crystal display.

The vertical electric field applying type liquid crystal display enables the liquid crystal display of a TN (Twisted Nematic) mode to be driven by a vertical electric field formed between a common electrode and a pixel electrode disposed to be opposite to upper and lower substrates. The vertical electric field applying type liquid crystal display has an advantage that an opening ratio is large, but has a disadvantage that a viewing angle is narrow as about 90°.

The horizontal electric field applying type liquid crystal display enables the liquid crystal display of an in plane switch (hereinafter referred to as 'IPS') mode to be driven by a horizontal electric field formed between a common electrode and a pixel electrode disposed on a lower substrate in a line. The horizontal electric field applying type liquid crystal display has an advantage that a viewing angle is wide as about 160°, but has a disadvantage that an opening ratio and transmittance are low.

In order to improve such a disadvantage of the horizontal electric field applying type liquid crystal display, a fringe field switch (hereinafter referred to as "FFS") type liquid crystal display operated by a fringe field has been suggested. The FFS type liquid crystal display has a common electrode and a pixel electrode in each pixel region with an insulator film provided between the common electrode and the pixel electrode, wherein a distance between the common electrode and the pixel electrode is formed to be narrower than a distance between upper and lower substrates so that a fringe field can be formed. Furthermore, liquid crystal molecules filled into a gap between the upper and lower substrate are operated by the fringe field so that an opening ratio and transmittance can be improved.

In general, a capacitive touch sensor is formed at an upper portion of the liquid crystal display formed as described above. This is because, in terms of the principle of the touch sensor, the size of a capacitance formed between a user's finger and a sensing electrode reduces as a distance with a portion in contact with the user's finger increases, and thus a difference in voltages resulting from contact with the user's finger and non-contact with the user's finger is not large. Also, even though the size of the capacitance increases according to an increase in an area of a sensing electrode, when the touch sensor and a liquid crystal display driving part are formed at a lower portion of the liquid display, there is a limitation in sufficiently securing the area of the sensing electrode of the touch sensor.

That is, according to the conventional art, since the liquid crystal display and the capacitive touch sensor are formed on the lower and lower substrates, respectively, it is problematic in that a production process is complicated, a production cost is high, and the touch sensor is easily damaged by an external environment.

THE DETAILED DESCRIPTION OF THE INVENTION

Technical Problem

Accordingly, the present invention has been made keeping in mind the above problems occurring in the prior art, and an object of the present invention is to provide a thin film transistor liquid crystal display (TFT LCD) that is driven in a fringe field switch mode and is configured such that an area of a display pixel part is utilized as an area of an sensing electrode of a touch sensor part so that the display pixel part and the touch sensor part can be formed in one liquid crystal display layer.

Another object of the present invention is to provide a thin film transistor liquid crystal display (TFT LCD) in which a process for a touch sensor is included into a lower plate process so that a production process can be simplified, process efficiency can be increased, and a production cost can be reduced. Furthermore, the touch sensor can be prevented from being damaged by an external environment, and an entire thickness of the display and the touch sensor can be minimized.

Solution to Problem

In order to solve the above problems, according to an embodiment of the present invention, a thin film transistor liquid crystal display (TFT LCD) in which a capacitive touch sensor is embedded may include: a touch sensor source follower TFT formed on a substrate; a first electrode connected to a gate electrode of the touch sensor source follower TFT; a touch sensor reset TFT including the first electrode; an insulator film formed on the first electrode; a second electrode formed on the insulator film; and a display switching TFT connected to the second electrode, wherein the second electrode is connected to a drain electrode of the display switching TFT; the touch sensor reset TFT and the gate electrode of the touch sensor source follower TFT share the first electrode; and the first electrode is connected to the gate electrode of the touch sensor source follower TFT.

According to another embodiment of the present invention, a thin film transistor liquid crystal display (TFT LCD) in which a capacitive touch sensor is embedded may include: a touch sensor source follower TFT (TFT) formed on a substrate; a first electrode connected to a gate electrode of the touch sensor source follower TFT; a touch sensor reset TFT connected to the first electrode; a display switching TFT connected to a second electrode formed on the same plane as a plane on which the first electrode is formed, wherein the first electrode is connected to a drain electrode of the display switching TFT; the touch sensor reset TFT and the gate electrode of the touch sensor source follower TFT share the first electrode; and the first electrode is connected to the gate electrode of the touch sensor source follower TFT.

According to still another embodiment of the present invention, the TFT LCD may further include a display reset TFT which is configured such that a drain electrode is connected to the first electrode.

According to still another embodiment of the present invention, the TFT LCD may further include a touch sensor switching TFT connected to the gate electrode of the touch sensor source follower TFT to share a drain electrode.

According to still another embodiment of the present invention, the second electrode may be a pixel electrode.

According to still another embodiment of the present invention, the display switching TFT may include an active layer made with a low temperature polycrystalline silicon semiconductor, an oxide semiconductor or an amorphous silicon semiconductor.

According to still another embodiment of the present invention, the TFT LCD may further include: a sensor scanning line drive circuit part; a display scanning line drive circuit part; a data drive circuit part; and a sensor signal pre-amplifier circuit part.

According to still another embodiment of the present invention, the TFT LCD may be configured such that display scanning lines are disposed in an up and down symmetrical structure.

According to still another embodiment of the present invention, the TFT LCD may further include a coupling capacitor including a gate electrode of the touch sensor switch TFT as a lower electrode, and a sensing electrode connected to a source follower gate electrode as an upper electrode.

Advantageous Effects of Invention

According to the present invention, a thin film transistor liquid crystal display (TFT LCD) is driven in a fringe field switch (FFS) mode, and an area of a display pixel part is configured to be utilized as a sensing electrode area of a touch sensor part so that both the display pixel part and the touch sensor part can be formed in one liquid crystal displayer layer.

According to the present invention, a process for the touch sensor is included into a lower plate process of the TFT LCD so that a production process can be simplified, process efficiency can be increased, and a production cost can be reduced. Furthermore, damage to the touch sensor by an external environment can be reduced, and an entire thickness of the display and the touch sensor can be minimized.

MODE FOR THE INVENTION

Figure 1:
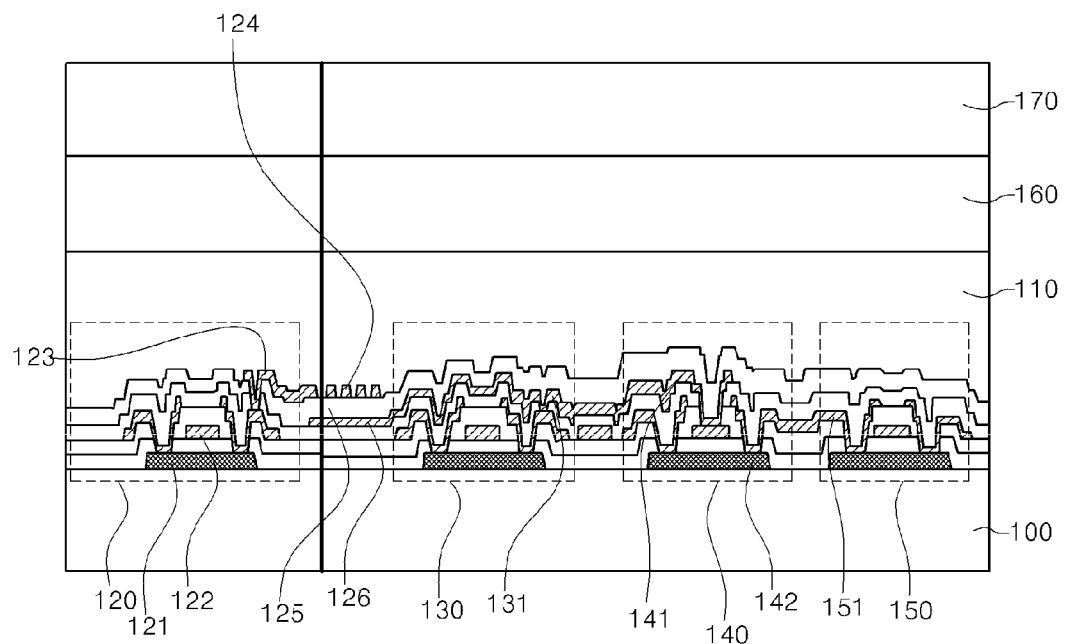
FIGS. 1 and 2 are cross-sectional views of a thin film transistor liquid crystal display (TFT LCD) having a capacitive touch sensor according to one embodiment of the present invention.

Preferred embodiments of the present invention will be hereinafter described with reference to the accompanying drawings. The detailed descriptions of known functions and configurations which have been deemed to make the gist of the present invention unnecessarily obscure will be omitted below. The sizes of components in the drawings may be exaggerated to make the description clearer rather than representing real sizes.

Figure 2:
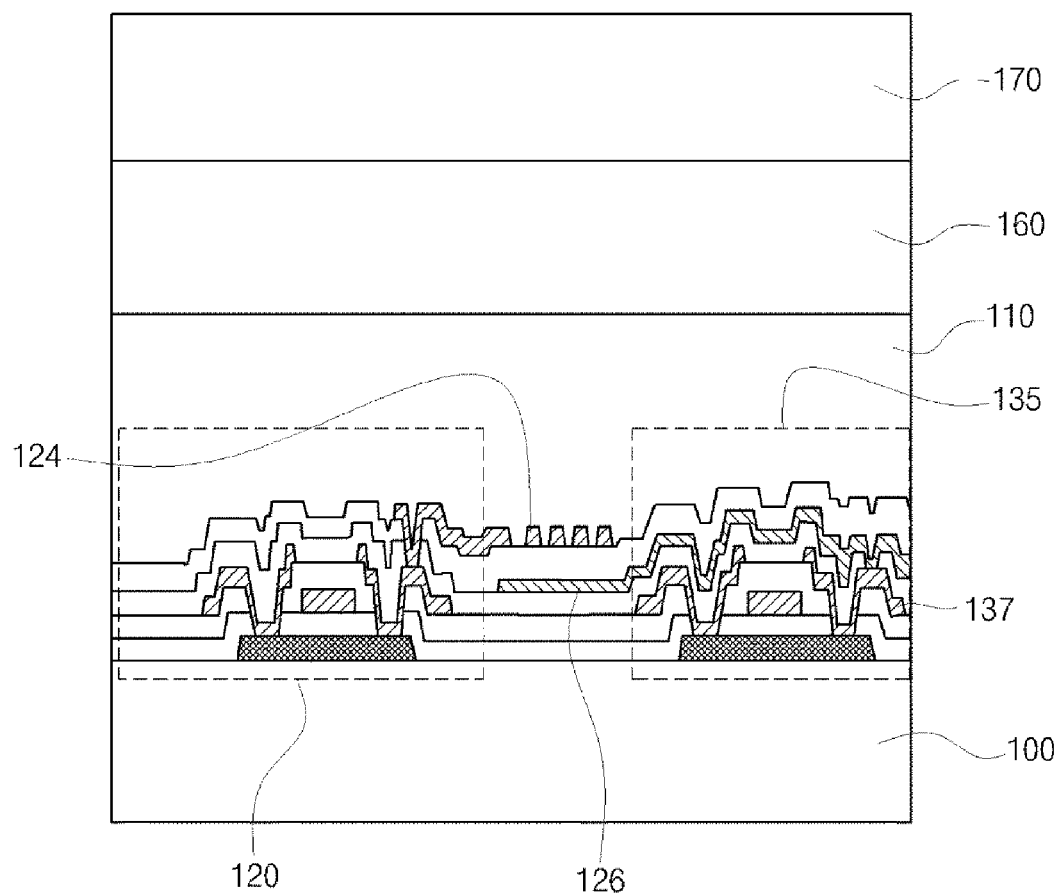

FIGS. 1 and 2 are cross-sectional views of a thin film transistor liquid crystal display (TFT LCD) having a capacitive touch sensor according to one embodiment of the present invention. More specifically, FIG. 1 is a view illustrating a cross section of a touch sensor part of the TFT LCD according to the one embodiment of the present invention, and FIG. 2 is a view illustrating a cross section of a display reset part. FIGS. 1 and 2 are views illustrating the one embodiment in which the liquid crystal display is operated in an FFS (Fringe Field Switch) mode.

The thin film transistor liquid crystal display (TFT LCD) in which a capacitive touch sensor is embedded will be described with reference to FIGS. 1 and 2.

Referring to FIGS. 1 and 2, as illustrated in FIG. 1, the TFT LCD in which the capacitive touch sensor is embedded may includes: a display switching TFT 120; a touch sensor reset TFT 130; a touch sensor source follower TFT 140; a touch sensor switching TFT 150; and a display reset TFT 135 illustrated in FIG. 2.

The display switching TFT 120, the touch sensor reset TFT 130, the display reset TFT 135, the touch sensor source follower TFT 140 and the touch sensor switching TFT 150 are formed on a substrate 100.

A drain electrode 123 of the display switching TFT 120 is connected to a second liquid crystal electrode 124, and the display switching TFT 120 includes an active layer 121 made with a low temperature polycrystalline silicon semiconductor, an oxide semiconductor or amorphous silicon semiconductor.

An insulator film 125 is formed at an upper portion of a first electrode 126, and a second electrode 124 is formed at an upper portion of the insulator film 125, wherein the second electrode 124 is connected to a drain electrode 123 of the display switching TFT 120. At this time, the second electrode 124 is composed of a pixel electrode.

The first electrode 126 is connected to a drain electrode 132 of the touch sensor reset TFT, and is connected to a gate electrode 143 of the touch sensor source follower TFT 140 via the touch sensor reset TFT 130. That is, the first electrode 126 is connected to the drain electrode 132 of the touch sensor reset TFT 130 and the gate electrode 143 of the touch sensor source follower TFT 140.

The touch sensor switching TFT 150 is configured to share the touch sensor source follower TFT 140 and a drain electrode 151.

Meanwhile, as illustrated in FIG. 2, the display reset TFT 135 is configured such that a drain electrode 137 is connected to the first electrode 126.

A glass top plate 160 is formed on an upper surface of the TFT LCD, and a polarizing plate 170 is formed at an upper part of the glass top plate 160.

Figure 3:
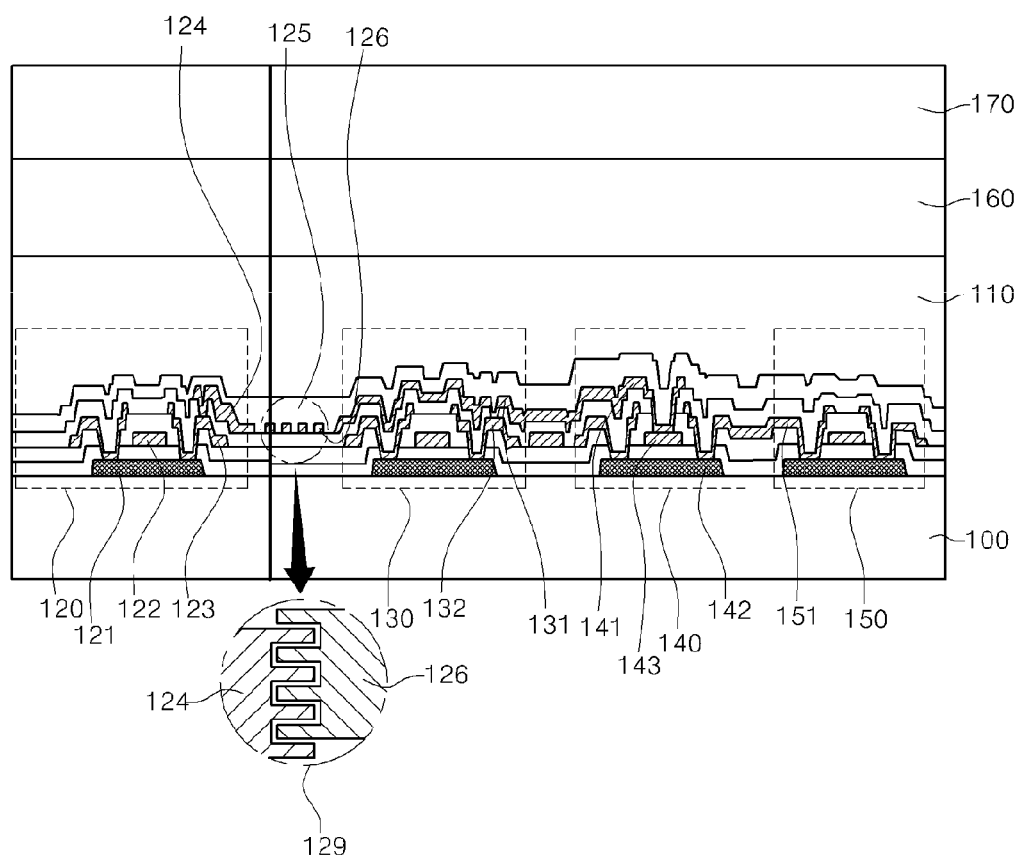
FIGS. 3 and 4 are cross-sectional views of a thin film transistor liquid crystal display (TFT LCD) having a capacitive touch sensor according to another embodiment of the present invention.
Figure 4:
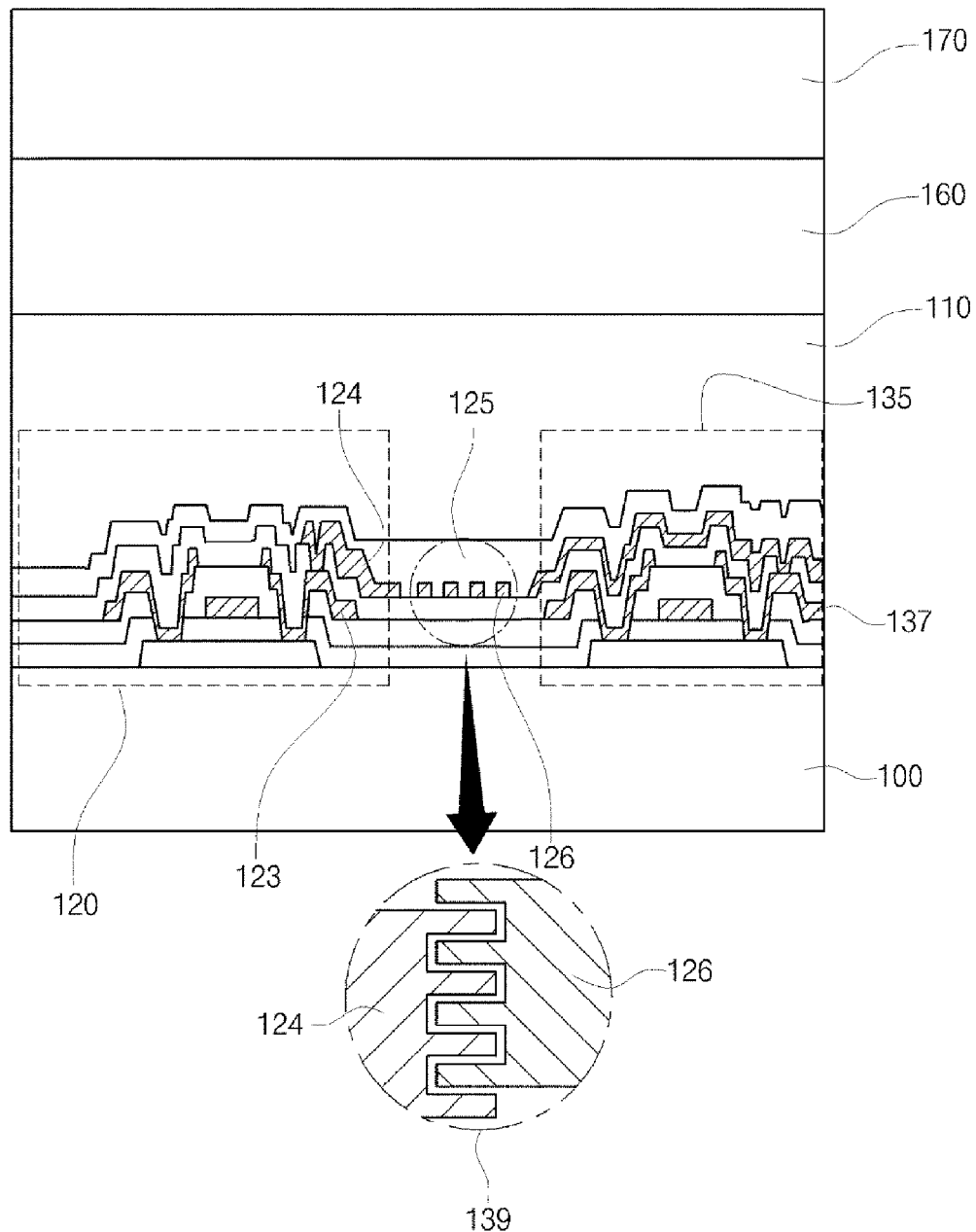

FIGS. 3 and 4 are cross-sectional views of a TFT LCD having a capacitive touch sensor according to another embodiment of the present invention. More specifically, FIG. 3 is a view illustrating a cross section of a touch sensor part of the TFT LCD according to another embodiment of the present invention and FIG. 4 is a view illustrating a cross section of a display reset part. FIGS. 3 and 4 are views illustrating the one embodiment in which a liquid crystal display is operated in an IPS (In Plane Switch) mode.

As illustrated in FIG. 3, a TFT LCD including a capacitive touch sensor according to another embodiment of the present invention includes: a display switching TFT 120; a touch sensor reset TFT 130; a touch sensor source follower TFT 140; a touch sensor switching TFT 150; and a display reset TFT 135 illustrated in FIG. 4.

The display switching TFT 120, the touch sensor reset TFT 130, the display reset TFT 135, the touch sensor source follower TFT 140 and the touch sensor switching TFT 150 are formed on a substrate 100.

A drain electrode 123 of the display switching TFT 120 is connected to a second electrode 124, and the display switching TFT 120 includes an active layer 121 made with a low temperature polycrystalline silicon semiconductor, an oxide semiconductor or amorphous silicon semiconductor.

The second electrode 124 and the first electrode 126 are present on the same plane, and an insulator film 125 is formed at an upper part thereof. The second electrode 124 is connected to a drain electrode 123 of the display switching TFT 120.

As illustrated in an enlarged view 129 of FIG. 3, the second electrode 124 and the first electrode 126 are configured to engage with each other.

The first electrode 126 is connected to a drain electrode 132 of the touch sensor reset TFT 130, and is connected to a gate electrode 143 of the touch sensor source follower TFT 140 via the touch sensor reset TFT 130.

The touch sensor switching TFT 150 is configured to share the touch sensor source follower TFT 140 and the drain electrode 151.

Meanwhile, as illustrated in FIG. 4, the display reset TFT 135 is configured such that the drain electrode 137 is connected to the first electrode 126.

Also, as illustrated in an enlarged view 139 of FIG. 4, the second electrode 124 and the first electrode 126 of the display switching TFT 120 are configured to engage with each other.

A glass top plate 160 is formed on an upper surface of the TFT LCD, and a polarizing plate 170 is formed at an upper portion of the glass top plate 160.

Figure 5:
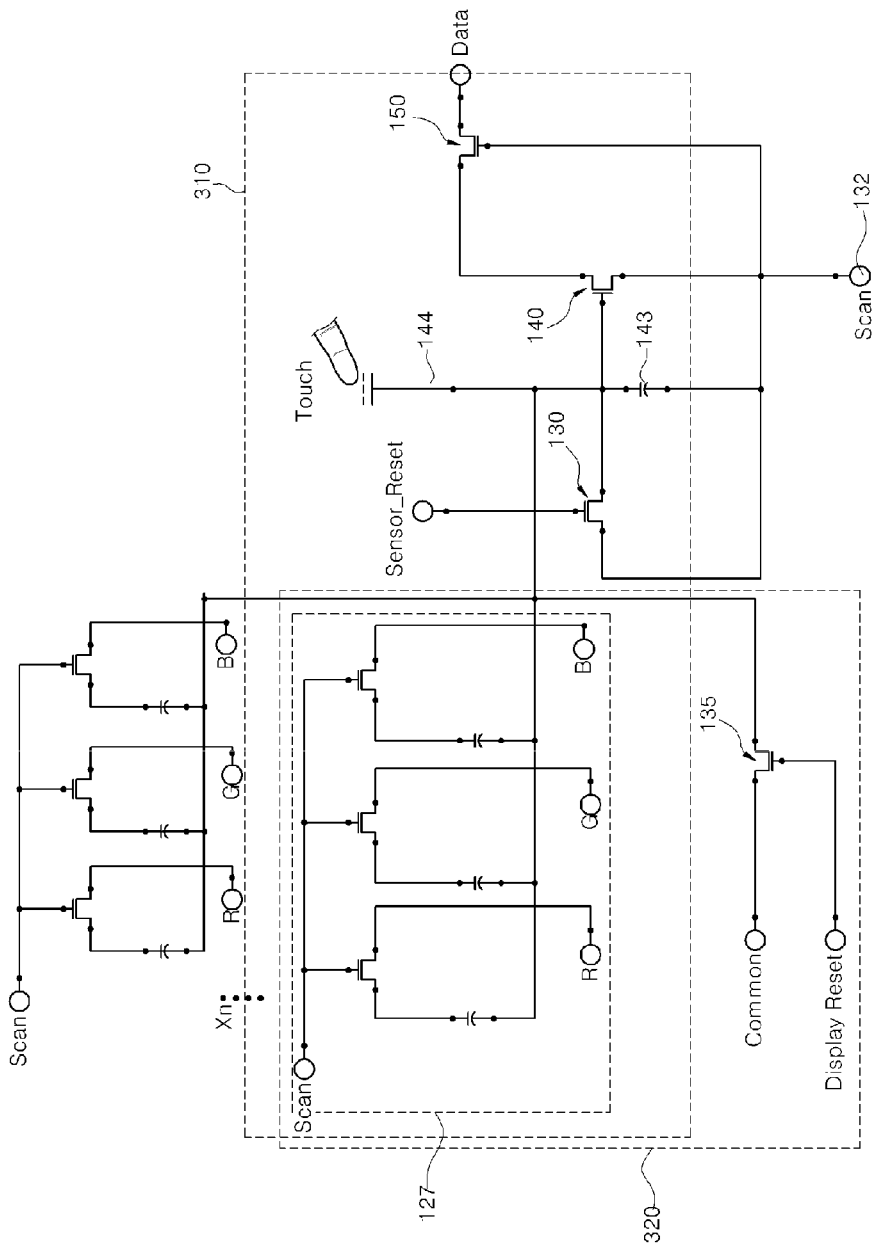
FIG. 5 is an equivalent circuit diagram of the TFT LCD having the capacitive touch sensor according to the one embodiment of the present invention.
Figure 6:
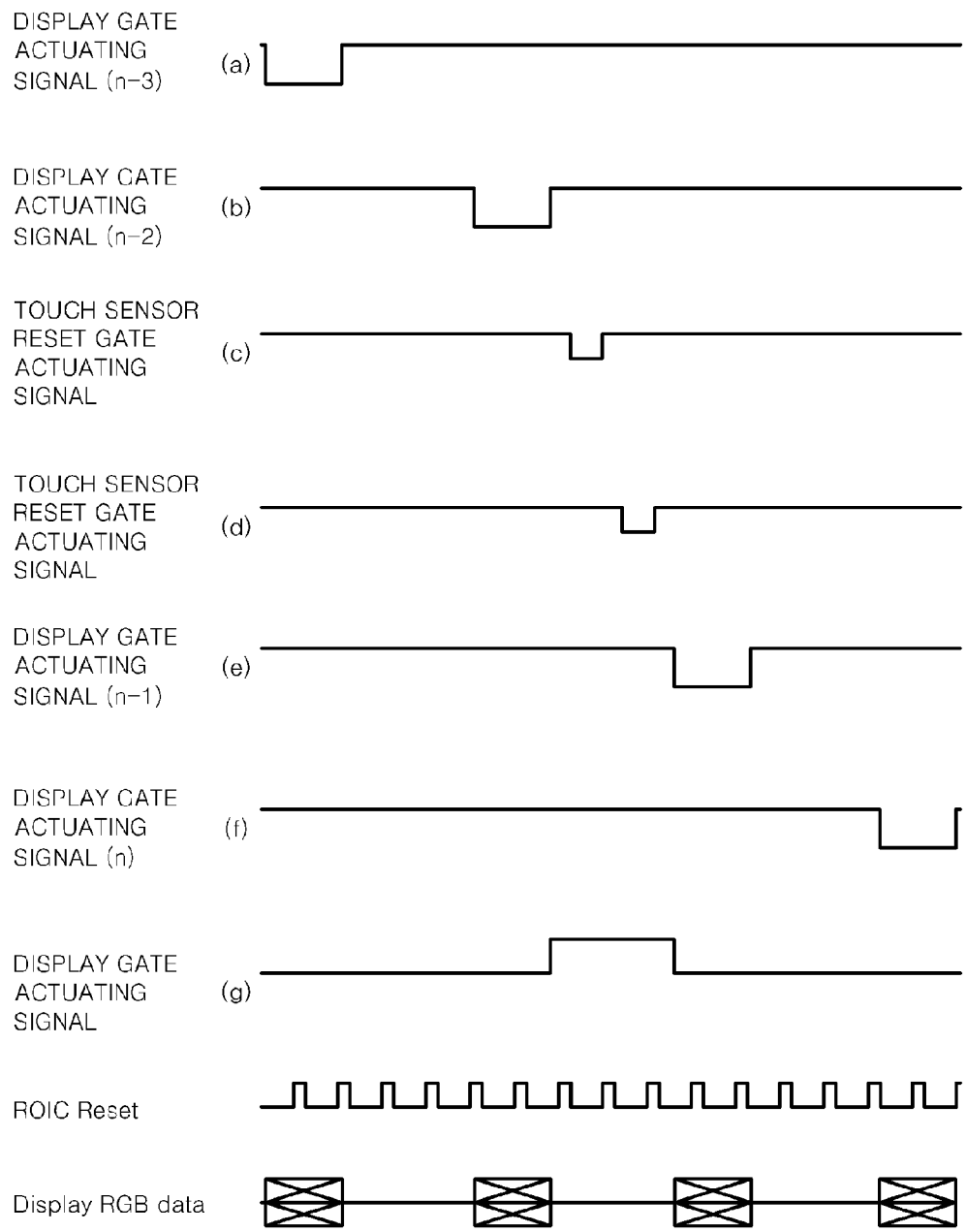
FIG. 6 is a view illustrating the driving timing of constitutive elements of the TFT LCD having the capacitive touch sensor according to the one embodiment of the present invention.

FIG. 5 is an equivalent circuit diagram of the TFT LCD including the capacitive touch sensor according to the one embodiment of the present invention, and FIG. 6 is a view illustrating driving timing of constitutive elements of the TFT LCD having the capacitive touch sensor according to the one embodiment of the present invention.

As illustrated in FIG. 5, the TFT LCD having the capacitive touch sensor according to the one embodiment of the present invention is largely divided into a sensor touch part 310 and a display reset part 320.

More specifically, the TFT LCD having the capacitive touch sensor according to the one embodiment of the present invention includes: a display pixel part 127; a touch sensor reset TFT 130; and a touch sensor source follower TFT 140, and also further includes a switching TFT 150 and a display reset TFT 135.

Meanwhile, (A), (B), (E), and (F) of FIG. 6 show gate driving signals of the display switching TFT 120, (C) of FIG. 6 shows a gate driving signal of the touch sensor reset TFT 130, (D) of FIG. 6 shows a driving signal of a touch sensor gate signal input line 132, and (G) of FIG. 6 shows a gate driving signal of the display reset TFT 135.

An operational method of the TFT LCD having the capacitive touch sensor according to the one embodiment of the present invention will be hereinafter described with reference to FIGS. 5 and 6.

In order for the TFT LCD to display a screen, a driving signal is input into a gate of the display switching TFT 120, and a common voltage is applied to the first electrode 126 illustrated in FIG. 1 via the display reset TFT 135.

At this time, when the gate driving signals of the display switching TFT 120 shown in (A), (B), (E) and (F) of FIG. 6 are input, the display reset TFT 135 is turned off as shown in (G) of FIG. 6 at the timing of inputting the gate driving signals of the display switching TFT 120 performed between (B) and (E) of FIG. 6, so that the first electrode 126 can be in an electrical short-circuit state.

At this time, after the touch sensor reset TFT 130 has been turned on as shown in (C) of FIG. 6 at the timing when the display reset TFT 135 is turned off as shown in (G) of FIG. 6, when an actuating signal is input into the touch sensor gate signal input line 132 as shown in (D) of FIG. 6, the lower electrode 126b is operated as a sensing electrode of the touch sensor.

Meanwhile, the process for turning on the touch sensor reset TFT 130 as shown in (C) of FIG. 6 is intended to initialize a voltage state of the first electrode 126.

As such, when the first electrode 126 is operated as the sensing electrode of the touch sensor by inputting the actuating signal into the touch sensor gate signal input line 132, a voltage of the sensing electrode is changed by voltage coupling of a coupling capacitance 143 and a finger print capacitance 144, and thus the touch sensor source follower TFT 140 is operated.

Also, the touch sensor switching TFT 150 outputs the electric current and voltage changed according to the operation of the touch sensor source follower TFT 140.

That is, the touch sensor source follower TFT 140 is operated in such a way that a gate voltage is changed by using a difference in voltage generated according to the presence or absence of a fingerprint due to a voltage coupling phenomenon generated between the coupling capacitance 143 and the finger print capacitance 144. In order to reduce the number of gate lines, a coupling pulse voltage is applied to a drain side of the touch sensor source follower TFT 140 and a gate side of the touch sensor switching TFT 150 at the same time via one gate line.

As such, the process for the touch sensor is included into the lower plate process of the TFT LCD so that a process can be more simplified and process efficiency can be increased, process efficiency can be improved, a production cost can be reduced. Furthermore, damage to the touch sensor by an external environment can be reduced, and an entire thickness of the display and the touch sensor can be minimized.

Figure 7:
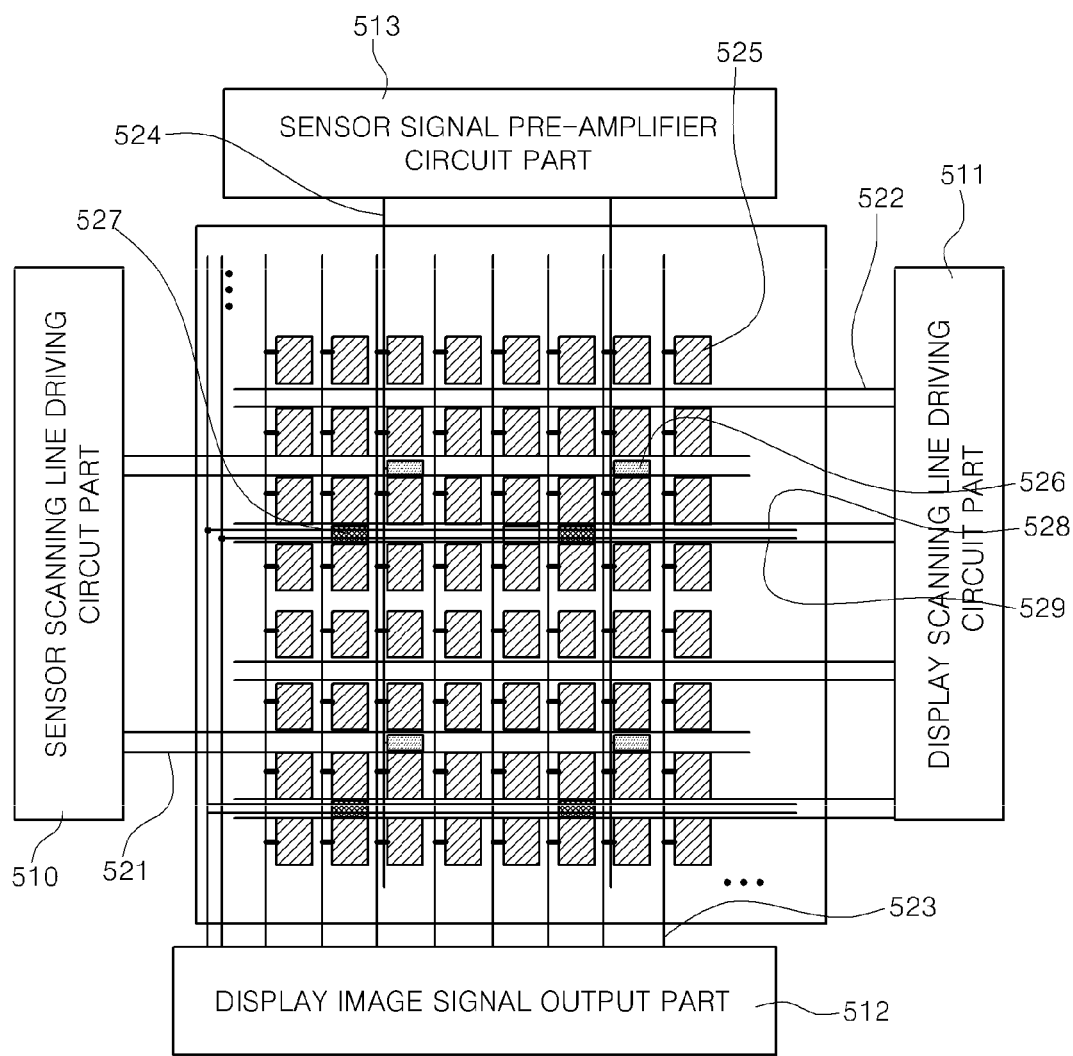
FIG. 7 is a block diagram of the TFT LCD having the capacitive touch sensor according to the one embodiment of the present invention.

FIG. 7 is a block diagram of the TFT LCD including the capacitive touch sensor according to the one embodiment of the present invention.

As illustrated in FIG. 7, the TFT LCD having the capacitive touch sensor according to the one embodiment of the present invention includes: a liquid crystal display pixel part 525; a touch sensor pixel part 526; and a display reset part 527.

The liquid crystal display pixel part 525 includes a display switching TFT; the touch sensor pixel part 526 includes a touch sensor reset TFT, a source follower TFT, and a switching TFT; and the display reset part 527 includes a display reset TFT.

Also, the TFT LCD having the capacitive touch sensor according to the one embodiment of the present invention includes: a touch sensor gate signal input line 521; a display gate signal input line 522; a display data signal input line 523; a sensor signal output line 524; a display reset signal input line 528; and a common electrode signal input line 529.

Meanwhile, the display data signal input line 523 is disposed in an up and down symmetrical structure based on the liquid crystal display pixel part 525 so that a space intended for disposing a sensor signal output line can be secured.

The touch sensor gate signal input line 521 receives actuating signals for each scanning line of the touch sensor inputted from a sensor scanning line driving circuit part 510 and transmits the actuating signals to the liquid crystal display pixel part 525.

Meanwhile, the touch sensor gate signal includes a touch sensor selection signal and a touch sensor reset signal and may cover two cases such as a case in which two signals do not share input lines, and a case in which a gate driving signal of the touch sensor reset TFT becomes a selection signal of the front or rear touch sensor so that the number of signal input lines can be reduced.

The display gate signal input line 522 receives the actuating signals for each scanning line of the display inputted from a display scanning line driving circuit part 511 and transmits the actuating signals to the touch sensor pixel part 526.

The display data signal input line 523 transmits a driving signal received from a display image signal output part 512 to the liquid crystal display pixel part 525.

The sensor signal output line 524 transmits a touch sensing signal received from the touch sensor pixel part 526 to a sensor signal pre-amplifier circuit part 513.

The display reset signal input line 528 transmits a signal for operating the display reset TFT and received from the display image signal output part 512 to the display reset part 527.

The common electrode signal input line 529 receives a common electrode signal inputted from the display image signal output part 512 and transmits the common electrode signal to the display reset part 527.

Therefore, according to the present invention, in order for the TFT LCD to be operated in an FFS (Fringe Field Switch) mode or an IPS (In-Plane Switch) mode, the TFT LCD is configured such that an area of the display pixel part is utilized as an area of the sensing electrode of the touch sensor part so that the display pixel part and the touch sensor part can be formed in one liquid crystal display layer, and the process for the touch sensor is included into the lower plate process of the TFT LCD so that a process can be simplified, process efficiency can be increased, and a production cost can be reduced. Furthermore, damage to the touch sensor by an external environment can be reduced and an entire thickness of the display and the touch sensor can be minimized.

As previously described, in the detailed description of the invention, having described the detailed exemplary embodiments of the invention, it should be apparent that modifications and changes can be made by persons skilled without deviating from the spirit or scope of the invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims and their equivalents.

What is claimed is:

1. A thin film transistor liquid crystal display (TFT LCD) in which a capacitive touch sensor is embedded, the TFT LCD comprising:
    a touch sensor source follower TFT formed on a substrate;
    a first electrode connected to a gate electrode of the touch sensor source follower TFT;
    a touch sensor reset TFT including the first electrode;
    an insulator film formed on the first electrode;
    a second electrode formed on the insulator film; and
    a display switching TFT including the second electrode,
    wherein the second electrode is connected to a drain electrode of the display switching TFT; the touch sensor reset TFT and the gate electrode of the touch sensor source follower TFT share the first electrode; and the first electrode is connected to the gate electrode of the touch sensor source follower TFT.

2. The TFT LCD of claim 1, further comprising a display reset TFT which is configured such that a drain electrode is connected to the first electrode.

3. The TFT LCD of claim 1, further comprising a touch sensor switching TFT that shares the touch sensor source follower TFT and a drain electrode.

4. The TFT LCD of claim 1, wherein the second electrode is a pixel electrode.

5. The TFT LCD of claim 1, wherein the display switching TFT comprises an active layer made with a low temperature polycrystalline silicon semiconductor, an oxide semiconductor or an amorphous silicon semiconductor.

6. The TFT LCD of claim 1, further comprises: a sensor scanning line drive circuit part; a display scanning line drive circuit part; a data drive circuit part; and a sensor signal pre-amplifier circuit part.

7. The TFT LCD of claim 1, wherein display scanning lines are disposed in an up and down symmetrical structure.

8. The TFT LCD of claim 1, comprising a coupling capacitor including a gate electrode of the touch sensor switch TFT as a lower electrode, and a sensing electrode connected to a source follower gate electrode as an upper electrode.

9. A thin film transistor liquid crystal display (TFT LCD) in which a capacitive touch sensor is embedded, the TFT LCD comprising:
    a touch sensor source follower TFT formed on a substrate;
    a first electrode connected to a gate electrode of the touch sensor source follower TFT;
    a touch sensor reset TFT including the first electrode;
    a display switching TFT including a second electrode formed on the same plane as a plane on which the first electrode is formed,
    wherein the first electrode is connected to a drain electrode of the display switching TFT; the touch sensor reset TFT and the gate electrode of the touch sensor source follower TFT share the first electrode; and the first electrode is connected to the gate electrode of the touch sensor source follower TFT.

10. The TFT LCD of claim 9, further comprising a display reset TFT which is configured such that a drain electrode is connected to the first electrode.

11. The TFT LCD of claim 9, further comprising a touch sensor switching TFT formed to share the touch sensor source follower TFT and a drain electrode.

12. The TFT LCD of claim 9, wherein the second electrode is a pixel electrode.

13. The TFT LCD of claim 9, wherein the display switching TFT comprises an active layer made with a low temperature polycrystalline silicon semiconductor, an oxide semiconductor or an amorphous silicon semiconductor.

14. The TFT LCD of claim 9, further comprising: a sensor scanning line drive circuit part; a display scanning line drive circuit part; a data drive circuit part; and a sensor signal pre-amplifier circuit part.

15. The TFT LCD of claim 9, wherein display scanning lines are disposed in an up and down symmetrical structure.

16. The TFT LCD of claim 9, comprising a coupling capacitor including a gate electrode of the touch sensor switch TFT as a lower electrode, and a sensing electrode connected to a source follower gate electrode as an upper electrode.

* * * * *